(12) United States Patent
Porter

(10) Patent No.: US 11,901,094 B2
(45) Date of Patent: Feb. 13, 2024

(54) NUCLEAR WASTE RETRIEVABLE DISPOSAL DEVICE, SYSTEM, AND METHOD

(71) Applicant: Craig Porter, Rexburg, ID (US)

(72) Inventor: Craig Porter, Rexburg, ID (US)

(*) Notice: Subject to any disclaimer, the term of this patent is extended or adjusted under 35 U.S.C. 154(b) by 0 days.

(21) Appl. No.: 18/092,213

(22) Filed: Dec. 31, 2022

(65) Prior Publication Data

US 2023/0146481 A1    May 11, 2023

Related U.S. Application Data

(63) Continuation of application No. 16/829,502, filed on Mar. 25, 2020, now Pat. No. 11,721,449, which is a continuation-in-part of application No. 16/773,345, filed on Jan. 27, 2020, now abandoned.

(60) Provisional application No. 62/775,215, filed on Dec. 4, 2018.

(51) Int. Cl.
| | |
|---|---|
| *G21F 9/34* | (2006.01) |
| *G21F 9/24* | (2006.01) |
| *G21F 5/005* | (2006.01) |

(52) U.S. Cl.
CPC ............. *G21F 9/34* (2013.01); *G21F 5/005* (2013.01); *G21F 9/24* (2013.01)

(58) Field of Classification Search
CPC .............. G21F 9/24; G21F 9/34; G21F 5/005
See application file for complete search history.

(56) References Cited

U.S. PATENT DOCUMENTS

| | | | |
|---|---|---|---|
| 3,675,428 A | 7/1972 | Watts | |
| 4,178,109 A | 12/1979 | Krutenat | |
| 4,815,894 A | 3/1989 | Copson | |
| 4,875,429 A | 10/1989 | Murray et al. | |
| 4,877,353 A | 10/1989 | Wisotsky, Sr. | |
| 5,022,788 A | 6/1991 | Baird | |
| 5,171,483 A | 12/1992 | Tollison, Jr. | |
| 5,202,522 A | 4/1993 | Williams | |
| 5,733,066 A * | 3/1998 | Myers | G21F 9/36 |
| | | | 405/129.55 |
| 5,863,283 A | 1/1999 | Gardes | |
| 6,846,967 B2 | 1/2005 | Altersitz | |
| 7,736,094 B1 | 6/2010 | Bianchi et al. | |
| 9,631,454 B1 | 4/2017 | Sun et al. | |
| 2002/0088365 A1 | 7/2002 | Hickey | |
| 2003/0216606 A1 | 11/2003 | Engelhardt | |
| 2005/0047870 A1 | 3/2005 | Rode | |

FOREIGN PATENT DOCUMENTS

JP    2015158367 A    9/2015

* cited by examiner

*Primary Examiner* — Janine M Kreck
(74) *Attorney, Agent, or Firm* — Jason P. Webb; Pearson Butler

(57) ABSTRACT

A waste material depositing system for depositing waste material into a sub-seabed sediment of an ocean floor. There is a penetrator including a first disposal stage and a second disposal stage. The first disposal stage having an outer shell disposed about a cavity, the cavity being shaped and sized to receive a waste disposal canister. The second disposal stage being removably coupled to a top end of the first disposal stage by an automatic disengagement device, and having: an outer cylinder, a plurality of second disposal fins disposed along a length of the outer cylinder, and an arrestor system coupled to a top portion of the outer cylinder.

6 Claims, 12 Drawing Sheets

NUCLEAR WASTE RETRIEVABLE DISPOSAL DEVICE, SYSTEM, AND METHOD

CROSS-REFERENCE TO RELATED APPLICATIONS

This invention claims priority under 35 U.S.C. § 120/121, to the U.S. Continuation-In-Part application Ser. No. 16/829,502, by Craig Porter, filed on Mar. 25, 2020, therethrough, this invention claims priority under 35 U.S.C. § 120/121, to the U.S. Non-Provisional patent application Ser. No. 16/773,345, by Craig Porter, filed on Jan. 27, 2020, as well as claims priority, under 35 U.S.C. § 120, to the U.S. Provisional Patent Application No. 62/775,215 to Craig Porter filed on Dec. 4, 2018, all of which are incorporated by reference herein in their entirety.

BACKGROUND OF THE INVENTION

Field of the Invention

The present invention relates to nuclear waste, specifically devices, systems, and methods for disposing of nuclear waste in a reversable manner.

Description of the Related Art

Nuclear power plants use the heat generated from nuclear fission to convert water to steam to provide electricity. Because nuclear power plants do not burn fuel, they do not produce greenhouse gas emissions. By reliably providing power twenty-four hours a day, nuclear energy is an important part of the energy mix necessary to meet electricity demand. However, nuclear energy reactors, as well as nuclear weapons programs, create high-level nuclear waste that must be disposed of properly to prevent exposure to radioactive material.

Radioactive contamination control and waste management are essential to preventing accidental exposure to radioactive material. Currently, the United States has no central repository, and spent radioactive material is stored at or near one of the one hundred and twenty-one facilities across the country where it is generated. Depending on the material's source, radioactivity can last from a few hours to hundreds of thousands of years.

The advantages of, and needs for, repositories for nuclear waste have been known for many years. If nuclear waste is not disposed of properly, radioactive waste can adversely impact the environment by affecting the quality of air, water, and soil. More specifically, radioactive contamination can affect the human population by causing radiation poisoning or sickness, even death. For example, the Chernobyl disaster was a catastrophic nuclear accident that occurred in 1986 at a nuclear power plant in Northern Ukraine, Soviet Union, when a nuclear reactor exploded. The events of the Chernobyl accident resulted in fires that sent plumes of highly radioactive fallout into the atmosphere, affecting an extensive geographical area. Because of the Chernobyl accident, two hundred and thirty-seven people suffered from acute radiation sickness, of whom thirty-one died within the first three months. It is also estimated that up to 4,000 of the five million persons living in contaminated areas may have cancer-related deaths as a result of the accident.

In the mid-1980s, the Yucca Mountain Nuclear Waste Repository in Nye County Nevada, eighty miles from Las Vegas, was designated to be a deep geological repository for disposal of high-level nuclear waste originating in commercial facilities in the United States. However, since its proposal, the project has faced funding difficulties and has been contested by the public, particularly by Nevadans who don't want to import such dangerous materials into their backyard. Critics of the project also point out that natural forces, such as earthquakes and erosion, could render the site unstable. This leaves American utilities and the United States government without any designated long-term disposal site for nuclear waste. Today, most nuclear power plants in the United States have resorted to the indefinite on-site dry cask storage of waste in steel and concrete casks.

As a result, due to its radioactive nature, nuclear waste is preferably disposed in a sealed container and located far from human habitation. Several different methods, devices, and systems of disposing of nuclear waste have been presented over the years. One method includes disposing of it in canisters in sediments below international waters. Canisters containing nuclear waste are released from a ship and driven by gravity approximately fifty meters into the subseabed ooze of the ocean floor. This approach to disposal of nuclear waste places radioactive material away from areas where humans live.

Some improvements have been made in the field. Examples of references related to the present invention are described below in their own words, and the supporting teachings of each reference are incorporated by reference herein:

U.S. Pat. No. 4,877,353, issued to Wisotsky, Sr., discloses an apparatus and method for embedding hazardous waste material deeply within stable geological formations. The hazardous material is placed in containers and the containers are placed inside hollow piles. The piles are moved to an offshore location and driven into the seabed.

U.S. Pat. No. 5,171,483, issued to Tollison, Jr., discloses a method for the long term storage of radioactive hazardous waste in a hollowed out chamber of salt bed in which sealed, relatively incompressible containers of hazardous materials are immobilized in a regular spaced array with the remaining space in the chamber filled with a granular compressive load equalization medium.

U.S. Pat. No. 5,733,066, issued to Myers, discloses a hazardous waste containment vessel, and a method for its use, for safe, permanent disposal of hazardous waste in deep ocean pelagic sediment. The hazardous waste containment vessel is dropped into deep ocean water, descends through the water and penetrates the deep ocean pelagic sediment, thus burying the hazardous waste containment vessel in deep ocean pelagic sediment. The hazardous waste containment vessel has an elongated laminar walled container having first and second ends. The first end tapers to an apex having an angle selected to enhance penetration of the deep ocean pelagic sediment by the hazardous waste containment vessel. A dense filler material is carried within the elongated laminar walled container and isolates at least one hazardous waste containing drum member that is suspended within the dense filler material, from the interior layer of the elongated container member and from additional drum members suspended within the dense filler material. At least one fin member is carried by the second end of the laminar walled container for imparting hydrodynamic stability to the hazardous waste containment vessel during vertical descent through deep ocean water. To ensure adequate penetration, the containment vessel is provided with a self-arming and disarming explosive charge.

U.S. Pat. No. 7,736,094, issued to Bianchi et al., discloses a system includes a body portion having rear portion having a fluid intake port and a nose portion having a fluid discharge port. The body portion contains an omni-directional vibratory device, a pump, a fluid conduit that is coupled to the pump and the fluid discharge port, and a power source that is electrically connected to the vibratory device and the pump. The body portion may also contain control circuitry and two end caps rigidly fixed therein, wherein the fluid conduit passes through each end cap. The vibratory device and the pump may be activated by a sensor such as a hydrostatic pressure sensor, an accelerometer, or an altimeter. The body portion may also contain communications circuitry that remotely controls the vibratory device and the pump. The body portion is configured to house a payload such as a sensor system, a battery pack, or a ballast for anchoring.

U.S. Pat. No. 9,631,454, issued to Sun et al., discloses the present invention provides wellbore pressure control system and method for well cementation stages, and relates to the offshore oil and gas exploitation field. The wellbore pressure control system comprises: an injection pump; and a control device, configured to control the injection pump to inject a fluid or gas through an injection pipeline to a return pipeline that communicates with an annular space of the wellbore to decrease the pressure in the return pipeline and thereby decrease the pressure in the annular space, wherein, the density of the fluid or gas is lower than the density of a drilling fluid in the annular space. The technical scheme of the present invention can effectively prevent leaky zones from being fractured by high-density cement slurry in the well cementation process that may cause safety accidents such as well kick and well blowout, etc.

The inventions heretofore known suffer from a number of disadvantages which include: trapping waste in seismically active material, not being sufficiently secure, not being able to convert waste into an asset, not reducing environmental impact, functioning inconsistently, being unreliable and/or not functioning properly, producing chemical contamination, creating environmental contamination, being unable to retrieve a disposal canister, and having an irreversible disposal process.

What is needed is a device, system, and/or method for disposing and/or retrieving nuclear waste that solves one or more of the problems described herein and/or one or more problems that may come to the attention of one skilled in the art upon becoming familiar with this specification.

SUMMARY OF THE INVENTION

The present invention has been developed in response to the present state of the art, and in particular, in response to the problems and needs in the art that have not yet been fully solved by currently available nuclear waste disposal and retrieval devices, systems, and methods. Accordingly, the present invention has been developed to provide a waste material depositing and/or retrieving system for depositing waste material.

In one embodiment of the invention, there may be a waste material depositing system including a penetrator. The penetrator may include a first disposal stage and/or a second disposal stage. The first disposal stage may have an outer shell that may be disposed about a cavity. The cavity may be shaped and/or sized to receive a waste disposal canister. The second disposal stage may be removably coupled to a top end of the first disposal stage by an automatic disengagement device. The second disposal stage may have: an outer cylinder, a plurality of second disposal fins that may be disposed along a length of the outer cylinder, and/or an arrestor system that may be coupled to a top portion of the outer cylinder. There may be a canister retrieval mount coupled to a rear end of a canister.

In another embodiment of the invention, the arrestor system may include a plurality of petals that may be rotatably coupled to the outer cylinder. The petals may each have a closed mode and/or a deployed mode. The waste material depositing system may further comprise an inner cylinder that may be slidably coupled to an interior of the second disposal stage, disposed within an interior of the outer cylinder of the second disposal stage, and/or disposed within an interior of the outer shell of the first disposal stage.

In yet another embodiment of the invention, each petal may include: a petal portion; a petal pivot that may be coupled to the petal portion, and/or disposed within a body of the outer cylinder; and/or an L-shaped portion that may be coupled to the petal pivot opposite the petal portion, that may be in fixed angular relation to the petal portion, and/or disposed above a top surface of the inner cylinder. In a closed mode the petal portion may be disposed in alignment with the body of the outer cylinder. In an open mode the petal portion may be disposed substantially orthogonal to the body of the outer cylinder.

In a further embodiment of the invention, the outer shell of the first disposal stage may include a stop protrusion that may be coupled to an interior of the outer shell along a top portion of the outer shell and/or extending orthogonal therefrom. A bottom end of the inner cylinder may be disposed along the stop protrusion. The inner cylinder may include a perforated base plate that may be disposed along the bottom end of the inner cylinder and/or orthogonal thereto. A locking pin may be disposed within the body of the outer cylinder and/or extending outwardly therefrom, and/or removably coupled to a locking void that may be disposed within the inner cylinder. A transponder may be coupled to the penetrator. The first disposal stage may include a plurality of first disposal fins that may extend outwardly from the outer shell and/or may be disposed along a length of a top portion of the first disposal stage. The plurality of first disposal fins may align with the plurality of second disposal fins. The automatic disengagement device may include an impact-triggered spring-loaded latch. The spring-loaded latch may be pivotally coupled to the second disposal stage. The first disposal stage may include a lip that may be removably coupled to the spring-loaded latch. The first disposal stage may include a first transponder that may be coupled to the first disposal stage, and/or the second disposal stage may include a second transponder that may be coupled to the second disposal stage and/or in communication with the first transponder.

In still another embodiment of the invention, there may be a method of depositing waste material into a sub-seabed sediment of the ocean floor, that may include one or more of the steps of: receiving waste material; loading the waste material into a first disposal stage of a penetrator; loading the penetrator onto a disposal vessel; transporting the penetrator to a disposal site; releasing the penetrator from the disposal vessel at the disposal site; and/or penetrating the sub-seabed sediment of the ocean floor with the penetrator.

The penetrator may include the first disposal stage and/or a second disposal stage that may be removably coupled to the first disposal stage. The method may also include the steps of: uncoupling the second disposal stage from the first disposal stage; deploying an arrestor system; and/or activating a transponder. The arrestor system may be coupled to a top portion of the second disposal stage. The penetrator may include: a first disposal stage, that may have an outer shell that may be disposed about a cavity, the cavity may be shaped and/or sized to receive a waste disposal canister; and/or a second disposal stage that may be removably coupled to a top end of the first disposal stage by an automatic disengagement device, that may have: an outer cylinder, a plurality of second disposal fins that may be disposed along a length of the outer cylinder, and/or an arrestor system that may be coupled to a top portion of the outer cylinder. A transponder may be coupled to the penetrator.

More, in one embodiment of the invention, the method of depositing waste material into a sub-seabed sediment of the ocean floor may include the steps of activating a first transponder that may be coupled to the first disposal stage, and/or activating a second transponder that may be coupled to the second disposal stage and/or in communication with the first transponder. The method of depositing waste may also include the step of providing a radioactive power source to the first transponder and/or the second transponder.

Too, in one embodiment of the invention, there may be a method of reclaiming waste material from a sub-seabed sediment of the ocean floor that may include the steps of: identifying a second signal from a second transponder that may be coupled to a second disposal stage that may be located within a surface of a sub-seabed sediment of the ocean floor; homing in on the second signal and/or locating the second disposal stage; recognizing a first signal from a first transponder that may be coupled to a first disposal stage that may be located below the second disposal stage and/or within the sub-seabed sediment of the ocean floor; digging downward from the second disposal stage toward the first signal and/or locating the first disposal stage; and/or retrieving the first disposal stage from the sub-seabed sediment of the ocean floor. The first disposal stage may contain waste material, and/or thereby retrieving waste material from the sub-seabed sediment of the ocean floor. The method of reclaiming waste material from a sub-seabed sediment of the ocean floor may further include the step of drilling downward from the second disposal stage to the first disposal stage.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims or may be learned by the practice of the invention as set forth hereinafter.

BRIEF DESCRIPTION OF THE DRAWINGS

In order for the advantages of the invention to be readily understood, a more particular description of the invention briefly described above will be rendered by reference to specific embodiments that are illustrated in the appended drawing(s). It is noted that the drawings of the invention are not to scale. The drawings are mere schematics representations, not intended to portray specific parameters of the invention. Understanding that these drawing(s) depict only typical embodiments of the invention and are not, therefore, to be considered to be limiting its scope, the invention will be described and explained with additional specificity and detail through the use of the accompanying drawing(s), in which.

DETAILED DESCRIPTION OF THE INVENTION

Figure 1:
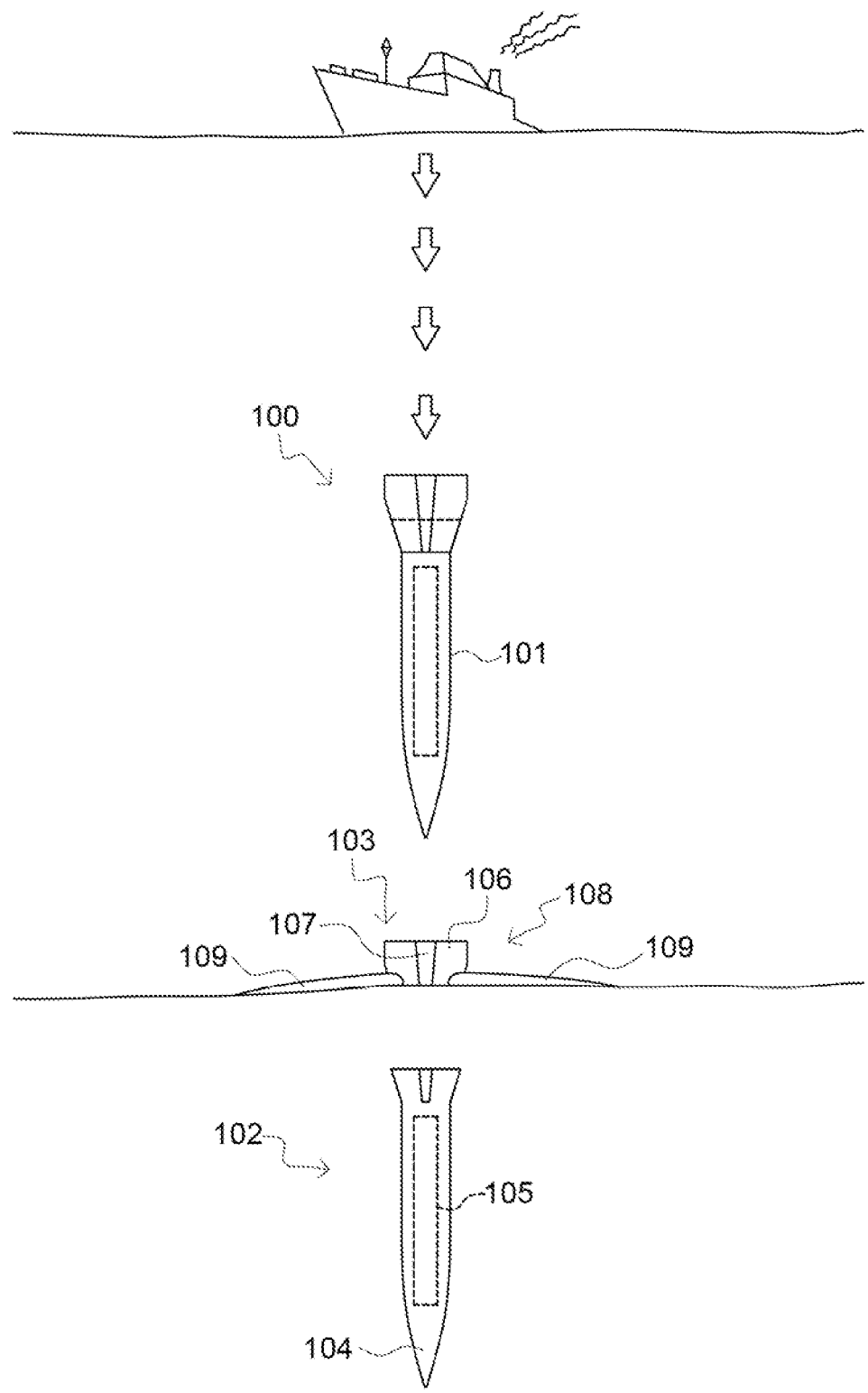
FIG. 1 illustrates a system of disposing of nuclear waste, according to one embodiment of the invention.

For the purposes of promoting an understanding of the principles of the invention, reference will now be made to the exemplary embodiments illustrated in the drawing(s), and specific language will be used to describe the same. It will nevertheless be understood that no limitation of the scope of the invention is thereby intended. Any alterations and further modifications of the inventive features illustrated herein, and any additional applications of the principles of the invention as illustrated herein, which would occur to one skilled in the relevant art and having possession of this disclosure, are to be considered within the scope of the invention.

Reference throughout this specification to an "embodiment," an "example" or similar language means that a particular feature, structure, characteristic, or combinations thereof described in connection with the embodiment is included in at least one embodiment of the present invention. Thus, appearances of the phrases an "embodiment," an "example," and similar language throughout this specification may, but do not necessarily, all refer to the same embodiment, to different embodiments, or to one or more of the figures. Additionally, reference to the wording "embodiment," "example" or the like, for two or more features, elements, etc. does not mean that the features are necessarily related, dissimilar, the same, etc.

Each statement of an embodiment, or example, is to be considered independent of any other statement of an embodiment despite any use of similar or identical language characterizing each embodiment. Therefore, where one embodiment is identified as "another embodiment," the identified embodiment is independent of any other embodiments characterized by the language "another embodiment." The features, functions, and the like described herein are considered to be able to be combined in whole or in part one with another as the claims and/or art may direct, either directly or indirectly, implicitly or explicitly.

As used herein, "comprising," "including," "containing," "is," "are," "characterized by," and grammatical equivalents thereof are inclusive or open-ended terms that do not exclude additional unrecited elements or method steps. "Comprising" is to be interpreted as including the more restrictive terms "consisting of" and "consisting essentially of."

FIG. 1 illustrates a system of disposing of nuclear waste, according to one embodiment of the invention. There is shown a system of disposing nuclear waste 100. The illustrated system 100 includes a penetrator 101. The penetrator 101 has a first disposal stage 102 and a second disposal stage 103 removably coupled to the first disposal stage 102. In the illustrated example, the two illustrated penetrators are the same penetrator, one is pre-separation (i.e. before striking the sea bed and breaking apart) and the other is post-separation (i.e. after striking the seabed and breaking apart). The first disposal stage 102 has an outer shell 104 and a cavity 105 disposed within the outer shell 104. The second disposal stage 103 has an outer cylinder 106 with a plurality of second disposal fins 107 disposed along the outer cylinder 106. The second disposal stage 103 also has an arrestor system 108 illustrated as a plurality of petals 109 disposed about the outer cylinder 106 between the plurality of second disposal fins 107.

The illustrated penetrator 101 includes a first disposal stage 102. The first disposal stage 102 is sized and shaped to penetrate a sub-seabed sediment of the ocean floor. As shown, a bottom portion of the first disposal stage 102 is pointed, thereby facilitating penetration of the seafloor. However, a bottom portion of the first disposal stage 102 may have any shape, such as, but not limited to pointed, rounded, or flat. The illustrated cavity 105 is sized and shaped to receive a waste disposal canister containing nuclear waste.

A second disposal stage 103 is removably coupled to a top end of the first disposal stage 102. Accordingly, the two stages 102 and 103 may be similar to stages of a multi-stage rocket, in that they are structured to hold together until a particular point in time or event, at which time they separate. The first disposal stage 102 is coupled directly below the second disposal stage 103 when the penetrator 101 is dropped from a ship. The first disposal stage 102 and the second disposal stage 103 are securely and removably coupled so that the first disposal stage 102 can be released from the second disposal stage 103 and penetrate the sub-seabed sediments of the ocean floor, leaving the second disposal stage at the seabed while the first disposal stage penetrates deeper into the seabed.

The illustrated second disposal stage 103 includes an outer cylinder 106. A plurality of second disposal fins 107 are illustrated as being disposed about a perimeter and along a length of the outer cylinder 106. The second disposal fins 107 are shaped, sized, and orientated to allow the second disposal stage 103 to more predictably navigate through water. The illustrated fins of both stages may also serve as shields to protect one or more automatic disengagement devices so that as the penetrator is descending towards the seabed, materials in the fluid do not foul the automatic disengagement device(s).

An arrestor system 108 is coupled to a top portion of the outer cylinder 106. The arrestor system 108 is configured to slow down and stop seabed penetration of the second disposal stage 103.

In operation, a penetrator 101 is dropped from a ship at the surface of the sea at a predetermined location above a selected seabed. The penetrator then descends by gravity towards the seabed below. The seabed may be selected for its location, lack of seismic activity over millennia, and other features that make it suitable for retrievable disposal of high-level nuclear waste (HLW). HLW is generally a type of nuclear waste created by the reprocessing of spent nuclear fuel. HLW contains many of the fission products and transuranic elements generated in the reactor core and is the type of nuclear waste with the highest activity. HLW generally accounts for over 95% of the total radioactivity produced in the nuclear power process. HLW may also include spent nuclear fuel which could be integral to the fuel assemblies or could be separated from the fuel assembly, e.g., fuel rods separate from assembly.

The penetrator 101 includes fins 107 that orient the penetrator 101 downward and may be angled to induce a spin in order to more accurately/consistently strike a desired position on the seabed, thereby permitting controlled disposal of large numbers of penetrators 101 in an array. Accordingly, after striking the seabed, the penetrator separates 101 into two components (a first disposal stage 102 and a second disposal stage 103), with the first disposal stage 102 penetrating deep into the seabed sediments (generally about fifty meters for a penetrator 101 shaped and sized to contain a standard sized canister), and with the second disposal stage 103 flaring its petals 109 at separation from the first disposal stage 102 and resting on or near the seabed floor, thus forming a "re-entry" cone to facilitate possible future retrieval. Because the sub-seabed sediments have a peanut-butter like consistency, the first disposal stage 102 is able to use the force of gravity to penetrate, and sink into, the ocean floor, thereby providing a safe and stable area for the retrievable disposal of nuclear waste. Each of the two stages 102, 103 may include a transponder/transmitter for locating and retrieving those stages.

Figure 2:
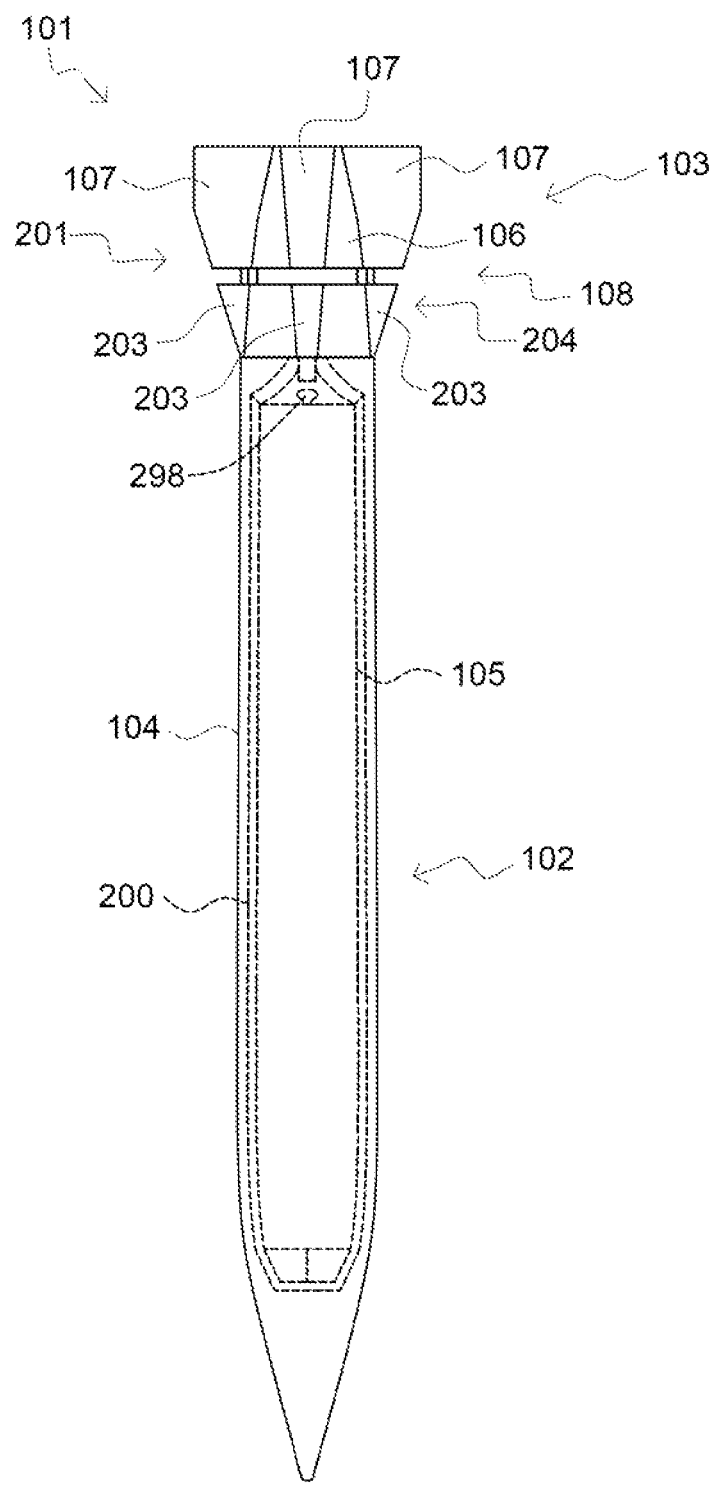
FIG. 2 is a side elevational view of a penetrator of a nuclear waste disposal device pre-separation, according to one embodiment of the invention.

FIG. 2 is a side elevational view of a penetrator of a nuclear waste disposal device pre-separation, according to one embodiment of the invention. There is shown a penetrator 101 including a first disposal stage 102 and a second disposal stage 103 removably coupled to the first disposal stage 102. The first disposal stage 102 has a waste disposal canister 200 disposed within a cavity 105 of an outer shell 104 of the first disposal stage 102. The first disposal stage 102 also has a plurality of first disposal fins 203 disposed along a top portion 204 of the first disposal stage 102. The second disposal stage 103 includes a plurality of second disposal fins 107 that are disposed along an outer cylinder 106 of the second disposal stage 103, and that align with the plurality of first disposal fins 203. The second disposal stage 103 also includes an arrestor system 108 coupled to the second disposal stage 103. An automatic disengagement device 201 is disposed between the first disposal stage 102 and the second disposal stage 103.

As shown, the penetrator 101 includes a first disposal stage 102 with an outer shell 104. The outer shell 104 includes a cavity 105 configured to store one or more canisters 200 containing nuclear waste. Accordingly, the outer shell 104 may be removably and/or slip-coupled to a canister 200 and/or may contain one or more liners/layers.

The first disposal stage 102 also includes a plurality of first disposal fins 203. The illustrated first disposal fins 203 align with the second disposal fins 107. According to one embodiment, the first disposal fins 203 may be relatively short in comparison to a vertical length of the penetrator 101. The first disposal fins 203 and/or the second disposal fins 107 may serve as a cowling for a latch. The plurality of fins are shaped and sized for stabilizing the penetrator 101 to efficiently move in a downward direction as the penetrator 101 is pulled by gravity.

The illustrated automatic disengagement device 201 couples the second disposal stage 103 to a top end of the first disposal stage 102. The disengagement device 201 is configured to removably couple the first disposal stage 102 and the second disposal stage 103 together. The disengagement device 201 may include a plurality of spring-loaded latches, each covered by a pair of hollow fins 203 and 107. The disengagement device 201 may include other and/or additional automatic disengagement systems, such as but not limited to exploding bolts, impact triggered magnetic couplings, and the like and combinations thereof.

The illustrated fins 203 and 107 may be hollow so that latches may be disposed within and/or protected by the hollow spaces of the fins 203 and 107. Accordingly, in the illustrated example, both stages 102 and 103 include fins 107 and 203, respectively, that work together pre-separation and that may cowl coupling structures, such as the automatic disengagement device 201, that couple the first disposal stage 102 and the second disposal stage together 103 so that those coupling structures 201 do not interfere with the desired pathing taken by the penetrator 101 during free-fall.

The illustrated canister 105 includes a canister retrieval mount 298 coupled to a rear end of the canister. The illustrated canister retrieval mount is a protrusion extending rearwardly from a rear face of the canister and is shaped similar to a door-knob, in that it provides a gripping surface that a retrieval unit (e.g. submersible drone) could use to grab and pull the canister up and out of the sub-seabed during retrieval. The canister retrieval mount may be of various shapes and configurations that provide a mounting point for a retrieval unit to access, such as but not limited to being an eye bolt, a flange, a lip, a plurality of rear-side protrusions, an aperture through a false rear of the canister, a threaded bolt or hole, and/or a structure that may be utilized as a mating structure to allow a retrieval unit to couple to the canister for retrieval.

The canister retrieval mount will generally include structure that is not easily fouled by debris/mud and that can be easily and reliably operated many years after placement in the sub-seabed. The canister retrieval mount may be integral to the canister or may be attached sometime during the disposal process. The attachment may be by a permanent fixing such as but not limited to welding, and/or it may be a more mechanical fixing, such as but not limited to using a clamping/bolting device/system to couple the canister retrieval mount to the canister.

Figure 3:
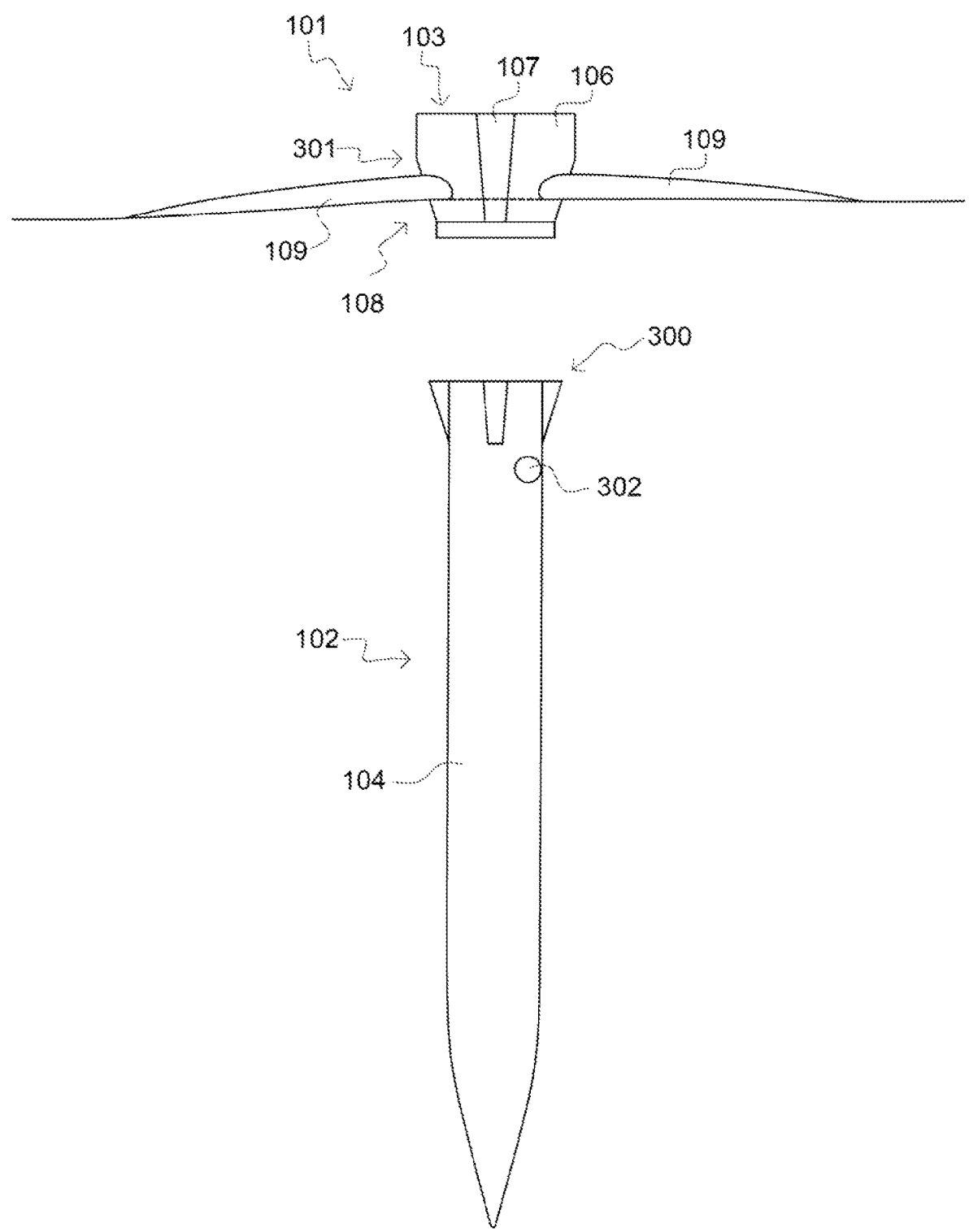
FIG. 3 is a side elevational view of a penetrator of a nuclear waste disposal device separated into first disposal stage and second disposal stage components, according to one embodiment of the invention.

FIG. 3 is a side elevational view of a penetrator of a nuclear waste disposal device separated into first disposal stage and second disposal stage components, according to one embodiment of the invention. In the illustrated view, the sub-seabed sediment is shown as transparent in order to provide a clear view of the two stages. As shown, the penetrator 101 includes a first disposal stage 102 separate from and removably coupleable to a second disposal stage 103. A top end 300 of the first disposal stage 102 is removably coupleable to the second disposal stage 103. The second disposal stage 103 includes a plurality of second disposal fins 107 and a deployed arrestor system 108 coupled to the second disposal stage 103. The deployed arrestor system increases the effective surface area of the second disposal stage 103 for the purpose of reducing the degree to which the second disposal stage sinks into the seabed.

The illustrated deployed arrestor system 108 includes a plurality of petals 109 flared out from and disposed about a top portion 301 of the outer cylinder 106. As shown, the plurality of petals 109 extend and secure the second disposal stage 103 onto a seabed or ocean floor. The plurality of petals 109 may also help prevent the second disposal stage from sinking into the seabed. The illustrated plurality of petals 109 are elongated/extended, and such may be accomplished by telescopic extension, by unfolding of folded layers, or otherwise. It may also be that the petals 109, when deployed, are not extended (e.g. see FIG. 7).

The penetrator 101 also includes a transponder/transmitter 302 coupled to an outer shell 104 of the first disposal stage 102. The illustrated transponder 302 may be a first transponder 302 that is coupled to the first disposal stage 102 of the penetrator 101. The transponder 302 may be configured to transmit and/or receive a signal. For instance, the first disposal stage 102 may have a transmitter 302 such as, but not limited to, a radio transmitter, a digital signal transmitter, a level transmitter, etc. There may be a second transponder/transmitter coupled to the second disposal stage. Accordingly, the second stage may be found by homing in on the second transponder and then the first stage may be found, thereafter, by homing in on the first transponder.

Figure 4:
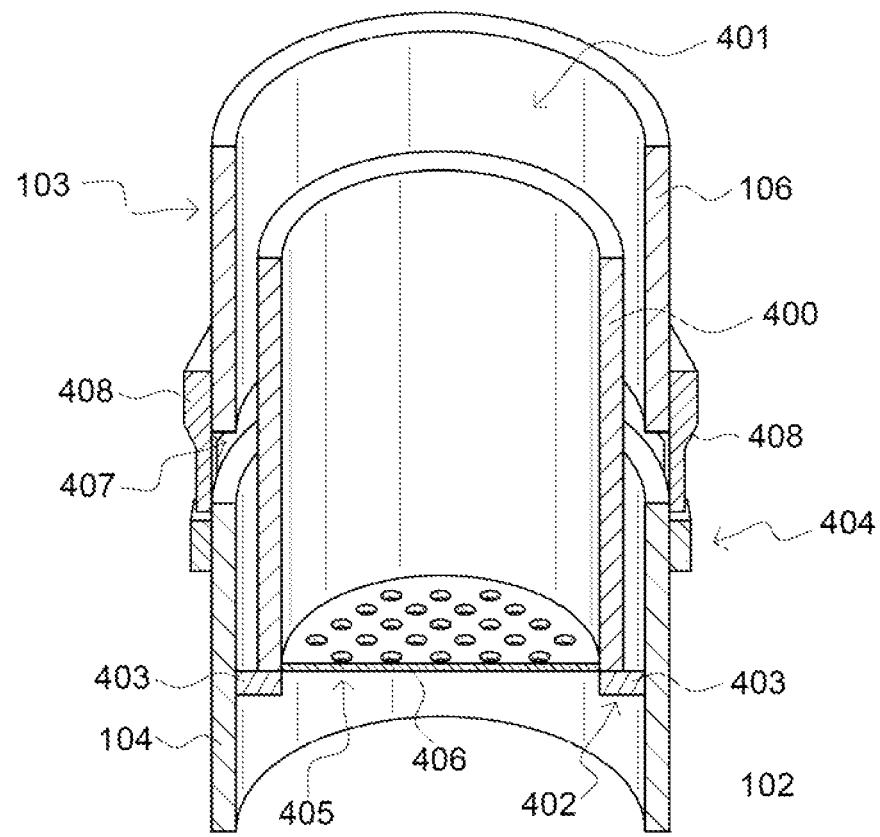
FIG. 4 is a partial side cross-sectional perspective view of a penetrator of nuclear waste disposal device, according to one embodiment of the invention.

FIG. 4 is a partial side cross-sectional perspective view of a penetrator of nuclear waste disposal device, according to one embodiment of the invention. As shown, a first disposal stage 102 is removably coupled to a second disposal stage 103 by a plurality of latches 408 (e.g. automatic engagement devices). The first disposal stage 102 includes an outer shell 104, and the second disposal stage 103 includes an outer cylinder 106.

An inner cylinder 400 is disposed within an interior of outer cylinder 401 of the second disposal stage 103 and is disposed within an interior of outer shell 402 of the first disposal stage 102. Accordingly, the inner cylinder bridges the two stages and forms a cap, of sorts, over the top of the first disposal stage. The inner cylinder nests inside the top of the first disposal stage and is functionally coupled to an interior bottom of the second disposal stage.

The first disposal stage 102 is shown to include a stop protrusion 403 coupled to a top portion of outer shell 404 and extending inwardly therefrom. The stop protrusion 403 prevents the inner cylinder from intruding further into the top of the first disposal stage. The stop protrusion 403 may be a ring welded to an interior of the first disposal stage, may be one or more ledges jutting to the interior of the first disposal stage, and/or may include other structures that protrude and thereby "stop" the inner cylinder from intruding beyond a predefined amount.

The illustrated inner cylinder 400 is disposed on the stop protrusion 403 and is slidably coupled to the second disposal stage 103. The inner cylinder 400 includes a bottom end of inner cylinder 405 with a perforated base plate 406 coupled to the bottom end 405. The illustrated perforated base plate 406 engages with the seabed material on separation and thereby anchors the second disposal stage to the seabed.

A purpose of the perforations of the perforated base plate 406 is to provide sufficient resistance upon contact with the sediments to allow some flow thru of the unconsolidated sediments while maintaining the pressure needed to lock partially deployed petals (See e.g., FIG. 1, Item 109) into their final deployed position. While the first disposal stage 102 continues its descent thru the sediments and comes to rest approximately fifty meters beneath the ocean floor, the second disposal stage 103 comes to rest on the surface of the ocean floor flared petals (See e.g., FIG. 1, Item 109), laying on the surface of the sediments. The second disposal stage 103 on the surface of the seafloor, thereby providing a target for detection of the transponder (See e.g., FIG. 3, Item 302) of the first disposal stage 102 and canister (See e.g., FIG. 2, Item 200) of nuclear waste.

More, resistance of the perforated base plate 406 of the inner cylinder 400, and/or deployed petals (See e.g., FIG. 1, item 109), with the seabed floor causes the second disposal stage 103 to decelerate while the first disposal stage 102 continues to penetrate into the seabed. Thus, the first disposal stage 102 separates from the second disposal stage 103 and the second disposal stage 103 remains in place on the seabed floor in a position that is vertically over the first disposal stage 102.

A separation gap 407 is disposed between the first disposal stage 102 and the second disposal stage 103. The illustrated separation gap 407 is between the first disposal stage 102 and the second disposal stage 103 so that the stages 102 and 103 are not in contact upon initial descent of the penetrator (See e.g., FIG. 1, Item 101). This allows for vertical motion of the second disposal stage 103 relative to the first disposal stage 102 on impact with the seabed, which motion may be utilized to trigger separation of the stages 102 and 103.

The illustrated stop protrusion 403, on impact with the seabed, may force the inner cylinder 400 to move relative to the second disposal stage 103, while not moving relative to the first disposal stage 102. This allows the inner cylinder to essentially "pull the trigger" on the automatic disengagement device and/or the arrestor system. Accordingly, the inner cylinder 400 may be utilized to trigger deployment of the petals (See e.g., FIG. 1, Item 109) while the separation gap 407 gets smaller during impact and separation. The inner cylinder 400 may also include a release mechanism or structure (not shown), such as but not limited to a hook, eye bolt, bolt mount, or the like or combinations thereof, from which to suspend and drop the entire penetrator (See e.g., FIG. 1, Item 101)).

Illustrated along the outer cylinder 106 of the second disposal stage 103, and along the outer shell 104 of the first disposal stage 102, there are a plurality of latches 408 for removably coupling the stages 102 and 103 together. The latches 408 may be configured to release when triggered by the penetrator (See e.g., FIG. 1, Item 101) hitting the seabed, thereby releasing the second disposal stage 103 from the first disposal stage 102. They may include any of a variety of release mechanisms that may be triggered, including but not limited to breakaway struts, cam bellies that force the latch to part when the separation gap is closed, explosive bolts/connectors, breakaway pins, and the like and combinations thereof. It may be that there are a plurality of release mechanisms that operate in parallel so that if a particular mechanism fails, the latch 408 will still be released by operation of a parallel mechanism. Further, there may be any number of latches 408 for removably coupling the first disposal stage 102 to the second disposal stage 103, such as but not limited to: one, two, four, or six.

In another non-limiting example, when the first disposal stage 102 hits the ocean floor, the downward velocity of the first disposal stage 102 is reduced, while the second disposal stage 103 continues until arrested by contact with the first disposal stage (i.e. closing the gap between the two stages). As a result, the second disposal stage 103 runs into the first disposal stage 102 when the first disposal stage 102 hits the ocean floor, thereby closing the separation gap 407 between the stages 102 and 103 and triggering the latches 408 to open. The second disposal stage 103 may then detach from the first disposal stage 102. The first disposal stage 102 will continue to travel downward due to inertia through the seabed mud. The pointed shape of a bottom portion of the first disposal stage 102 together with the fins (See e.g., FIG. 2, Item 203) of the first disposal stage 102 may keep the first disposal stage 102 in a generally linear trajectory so that its final storage location rests generally directly beneath the associated second disposal stage 103. The second disposal stage does not have the same penetrating characteristics (especially wherein an arrestor system is deployed on separation) as the first disposal stage and therefore does not penetrate the seabed to the same degree.

Figure 5:
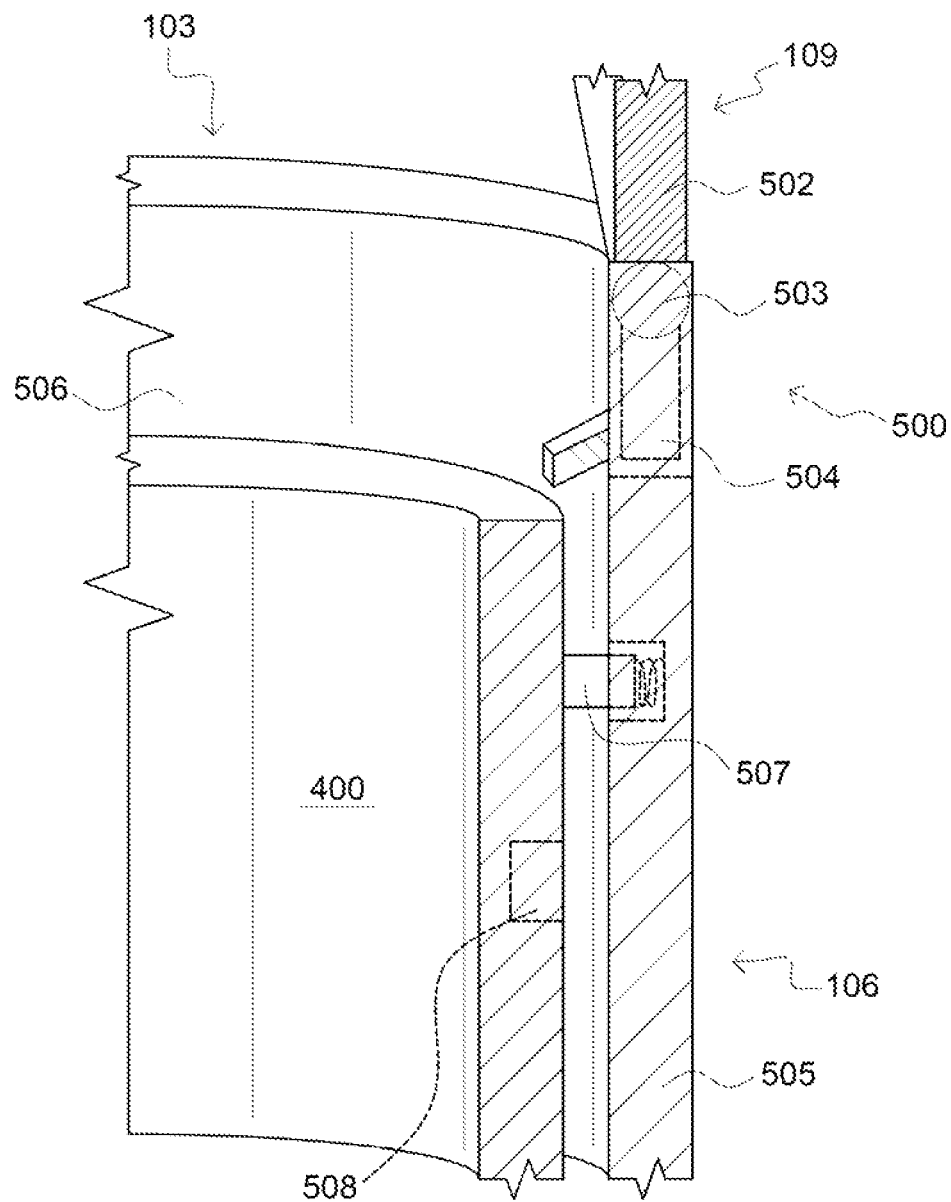
FIG. 5 is a partial side cross-sectional view of a second disposal stage of a nuclear waste disposal device pre-separation, according to one embodiment of the invention.
Figure 6:
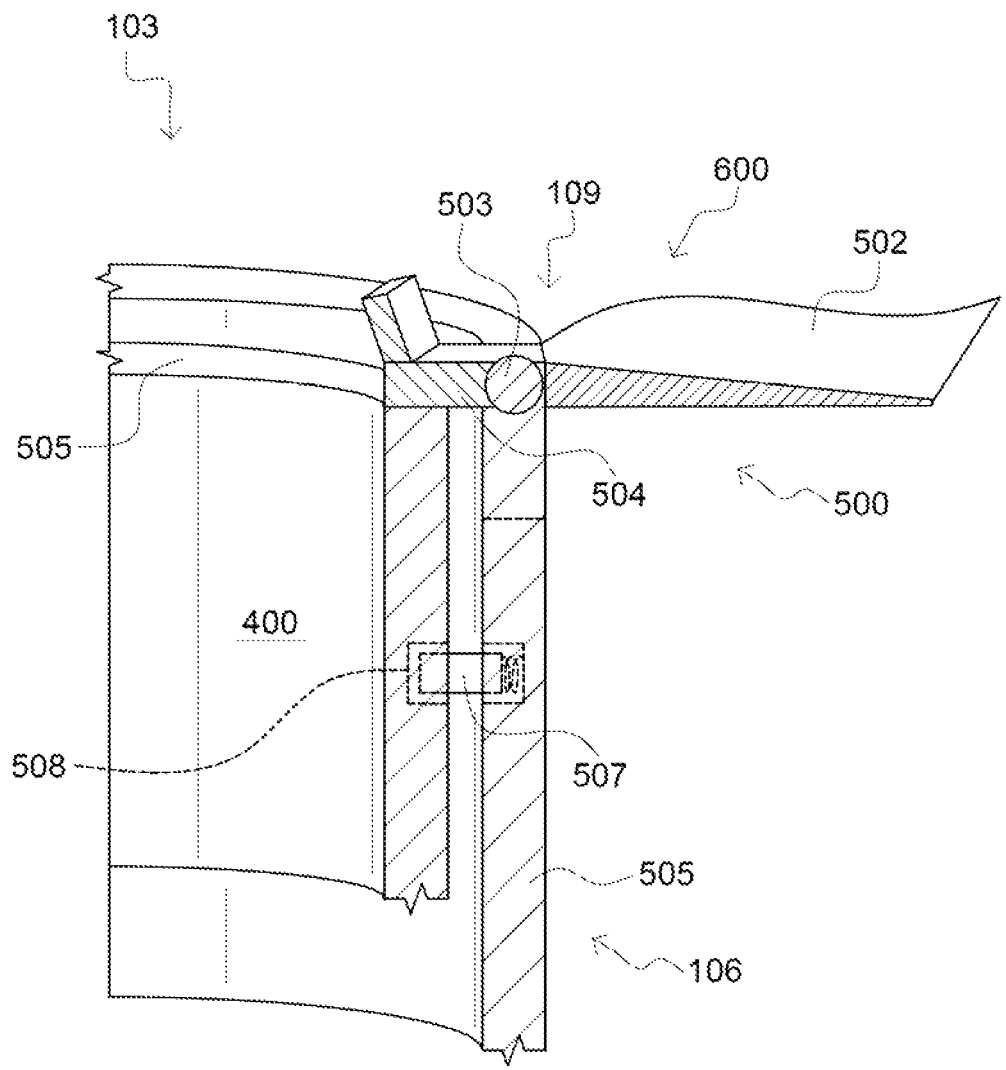
FIG. 6 is a partial side cross-sectional view of a second disposal stage of a nuclear waste disposal device post-separation, according to one embodiment of the invention.

Looking to FIGS. 5 and 6, there is shown a partial side cross-sectional view of a second disposal stage of a nuclear waste disposal device, according to one embodiment of the invention. FIG. 5 illustrates the second disposal stage in a closed, or undeployed, configuration, while FIG. 6 illustrates a deployed configuration that would occur after impact with the seabed.

In FIG. 5, there is shown a second disposal stage 103 with an outer cylinder 106. An arrestor system 500 is coupled to the outer cylinder 106 and is shown in a closed mode 503. The arrestor system includes a plurality of petals 109. Each petal 109 includes a petal portion 502, a petal pivot 503 coupled to the petal portion 502, and an L-shaped portion 504 coupled to the petal pivot 503 opposite the petal portion 502. The petal pivot 503 is disposed within a body of outer cylinder 505. An inner cylinder 400 is shown disposed within the outer cylinder 106. The inner cylinder 400 includes a top surface of inner cylinder 506 disposed below the L-shaped portion 504 in a closed mode 501. The outer cylinder 106 includes a locking pin 507, and the inner cylinder 506 includes a locking void 508.

The illustrated arrestor system 500 includes a plurality of petals 109 that are rotatably coupled to the outer cylinder 106. The illustrated L-shaped portion 504 is in fixed angular relation to the petal portion 502 and is disposed above a top surface 506 of the inner cylinder 400. The petal 109 is shown in a closed mode 501. Prior to petal 109 deployment, the L-shaped portion 504, and spring-loaded locking pin 507, may be stored in the body 505 of the outer cylinder 106 of the second disposal stage 103, such as shown by FIG. 5. Accordingly, the petal portion 502 is disposed in alignment with the body 505 of the outer cylinder 106.

In FIG. 6, the second disposal stage 103 includes an outer cylinder 106 and an inner cylinder 400 slidably coupled to the outer cylinder 106. The outer cylinder 106 includes an arrestor system 500 in a deployed mode 600. The arrestor system 500 includes a plurality of petals 109. Each petal 109 includes a petal portion 502, a petal pivot 503 coupled to the petal portion 502, and an L-shaped portion 504 coupled to the petal pivot 503 opposite the petal portion 502. The petal pivot 503 is rotatably coupled to a body of outer cylinder 505. Also illustrated, a top surface of inner cylinder 506 is disposed adjacent the L-shaped portion, and a locking pin 507 coupled to the outer cylinder 106 is disposed within a locking void 508 of the inner cylinder 400.

The illustrated arrestor system 500 includes a plurality of petals 109 that are rotatably coupled to the outer cylinder 106. The illustrated L-shaped portion 504 is in fixed angular relation to the petal portion 502 and is disposed above a top surface 506 of the inner cylinder 400. The petal 109 is shown in a deployed mode 600. Accordingly, the petal portion 502 is disposed substantially orthogonal to the body 505 of the outer cylinder 106. In a deployed mode 600, the petal portion 502 is disposed substantially orthogonal to the body 505 of the outer cylinder 106 so that the petal portion is perpendicular to the body 505 and a measure of an angle of where the petal portion 502 meets the body 505 is approximately ninety degrees.

In operation of one embodiment of the invention, an initial arrestor system 500, such as a spring-loaded pin 507 and L-shaped portion 504, deploys a petal portion 502 in a direction substantially parallel to a surface, or horizon, of the seafloor. In one non-limiting embodiment of the invention, a top surface 506 of an inner cylinder 400 is carried upward, with respect to the second disposal stage 103, by momentum of the penetrator (See e.g., FIG. 1, Item 101) in combination with the impact of the first disposal stage (See e.g., FIG. 1, Item 102) with the seabed. The top surface 506 of the inner cylinder 400 thereby contacts the L-shaped portion 504 and causes the same to pivot about the petal pivot 503. The petal portion 502 is fixedly coupled to the L-shaped portion 504 opposite the petal pivot 503 such that rotation of the L-shaped portion 504 about the petal pivot 503 causes rotation of the petal portion 502. Then, as the top surface 506 of the inner cylinder 400 contacts the L-shaped portion 504, the L-shaped portion 504 pivots, and the illustrated arrestor system 500 forces the petal portion 502 to pivot and the petals 109 to unfold and/or flare out.

Next, as the inner cylinder 400 continues to move upward with respect to the second disposal stage 103, a spring-loaded locking pin 507 extends into a locking void 508 of the inner cylinder 400 when the locking void 508 reaches the spring-loaded locking pin 507, thereby locking the second disposal stage 103 and the inner cylinder 400 together in place. The relative positions of the locking void 508 and the locking pin 507 are selected such that when the inner cylinder 400 is positioned, relative to the body 505 of the second disposal stage 103, in the desired final deployment position, the locking pin 507 and the locking void 508 are aligned, and thereby the locking pin 507 is trapped within the locking void 508, preventing further motion of the inner cylinder 400 relative to the second disposal stage 103. This position of the inner cylinder 400 causes the top surface 506 of the inner cylinder 400 to butt up against the leg of the L-shaped portion 504 and thereby also prevents the petals 19 from retracting. As a result, the petals 109 of the second disposal stage 103 are deployed in operation, and the deployed petal portions 502, keep the second disposal stage 103 anchored to a specific location, such as by piercing the seafloor. This is the illustrated arrestor system 500.

While a particular arrestor system is shown, it is understood that the specific mechanisms of arrestor systems may be plethoric and may include one or more of the following: triggers, triggering mechanisms, spring-loaded actuators, levers, magnetic actuators, deployable petals/wings/plates/arms, extendible/inflatable/telescopic petals/wings/plates/arms, and the like and combinations thereof. The arrestor system helps prevent the second disposal stage from sinking into the seabed.

Figure 7:
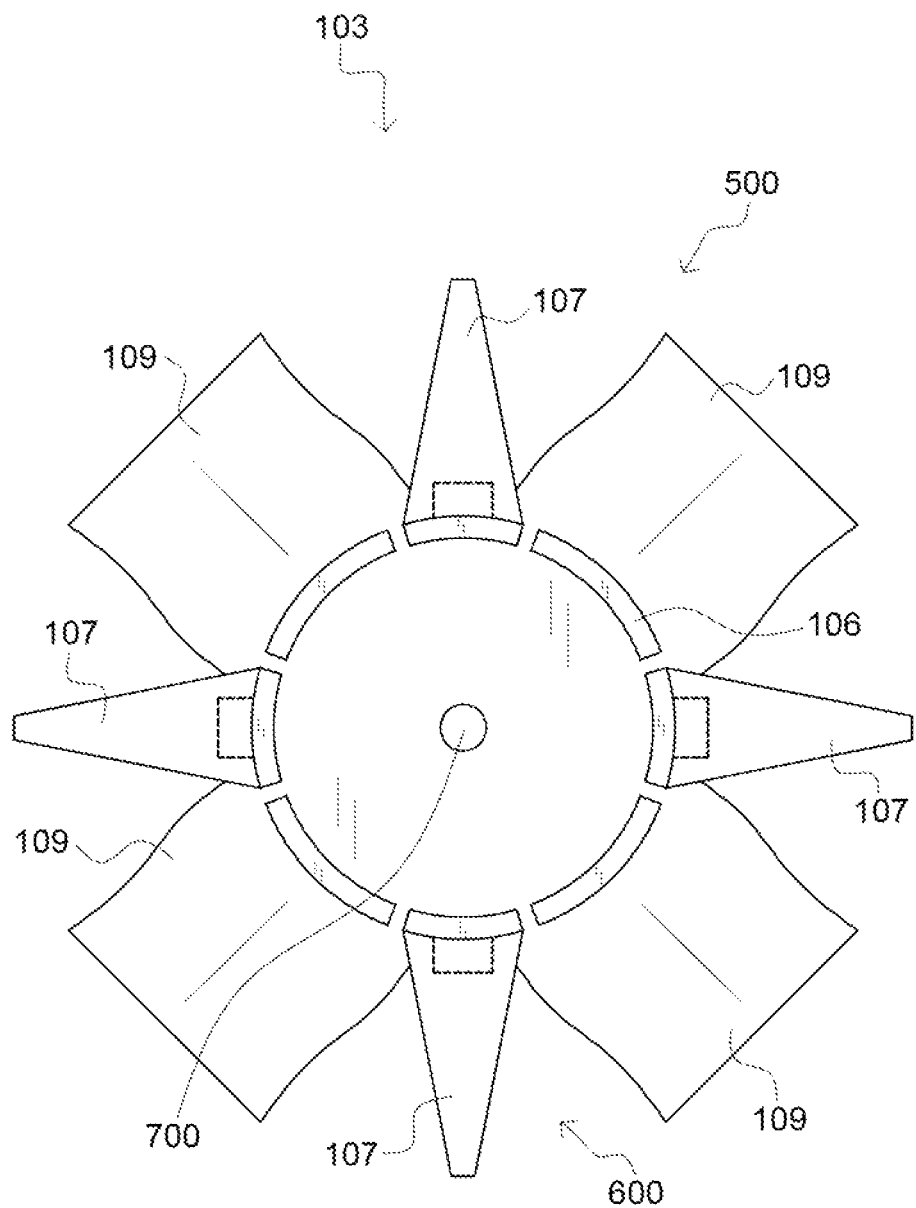
FIG. 7 is a top plan view of a second disposal stage of a nuclear waste disposal device, according to one embodiment of the invention.

FIG. 7 illustrates a top plan view of a second disposal stage of a nuclear waste disposal device, according to one embodiment of the invention. There is shown a second disposal stage 103 with an arrestor system 500 coupled to an outer cylinder 106 of the second disposal stage 103. As illustrated, the arrestor system 500 is shown in a deployed mode 600. The arrestor system 500 includes a plurality of petals 109 disposed between a plurality of second disposal fins 107 coupled to the outer cylinder 106. There is also shown a second transponder 700 coupled to the second disposal stage 103.

As shown, FIG. 7 illustrates an arrestor system 500 with deployable petals 109 coupled to the second disposal stage 103 and disposed between second disposal fins 107. The illustrated second disposal stage 103 includes four petals 109, however, the second disposal stage may contain any number of petals/plates/arms/wings/etc., such as four, five, ten, etc. In addition, while the illustrated petals are generally rectangular, they may have any shape, such as, but not limited to, petal- or cone-shaped, semi-circular, octagonal, irregular, and the like and combinations thereof.

Generally, the petals 109 will help form the body (See e.g., FIG. 5, Item 505) of the second disposal stage 103 between the fins 107 of the second disposal stage 103 pre-separation, and will open on separation to prevent the second disposal stage 103 from sinking too far into the seabed mud. They may also include indicators and the like, marking a target for retrieval of the first disposal stage (See e.g., FIG. 1, Item 102) below. Accordingly, the petals 109 may be sheet-like and/or metal and/or sheets of metal. In operation of one embodiment of the invention, the petals 109, are folded in until deployed. In order to deploy petals 109, there is also an initial petal deployment trigger, or mechanism, a finishing deployment mechanism, and a locking mechanism, respectively (e.g. See FIGS. 5 and 6).

The illustrated second transponder 700 may be in communication with the first transponder (See e.g., FIG. 3, Item 302). The transponders 700 (and FIG. 3, Item 302) may be powered using radioactive materials having a half-life sufficient to provide the necessary power for the expected operational lifetime of the transponders 700 (and FIG. 3, Item 302) so that the transponders 700 (and FIG. 3, Item 302) can be powered for the effective lifetime of the retrievable disposal period. For instance, the transponders 700 (and FIG. 3, Item 302) may be powered by a Pu-238 power supply, or other power supply, depending on the expected needs and operational characteristics.

The second transponder 700 and the first transponder (See e.g., FIG. 3, Item 302) may be configured to send/receive signals, or messages, such as, but not limited to signals for locating the second disposal stage 103 and the first disposal stage (See e.g., FIG. 1, Item 102). For example, the transponders 700 (and FIG. 3, Item 302) may be configured to transmit a variety of signals such as, but not limited to, radio and digital signals. Such signals may include data relating to the disposal stages (e.g. id number, contents, power level) and/or data relating to the disposal (e.g. date/time of drop/separation, accelerometer data from during the disposal and thereafter). Accordingly, during retrieval or inspection, one may locate a signal produced by the second disposal stage 103 and thereby determine the likely location of the first disposal stage (See e.g., FIG. 1, Item 102). The various transponders 700 (and See e.g., FIG. 3, Item 302) may include data storage devices that may be coupled to computing devices (e.g. processors) which may be able to operate scripts stored thereon or transmitted thereto. Further, it may be that the second disposal stage 103 may communicate with the first disposal stage (See e.g., FIG. 1, Item 102) and/or may act as a relay for communication with the first disposal stage (See e.g., FIG. 1, Item 102). Thereby, the system (See e.g., FIG. 1, Item 100) may track the deposited and deployed penetrator stages 103 (and Se e.g., FIG. 1, Item 102).

In operation of one embodiment of the invention, when the latches (See e.g., FIG. 4, Item 408) are triggered and the first disposal stage (See e.g., FIG. 1, Item 102) separates from the second disposal stage 103, the first disposal fins (See e.g., FIG. 2, Item 203) are also separated from the second disposal fins 107. In addition, when the stages 103 and (FIG. 1, Item 102) and fins 107 (and FIG. 2, Item 203) are separated, the petals 109 are deployed and open up to positions that significantly increase the bottom surface area of stage two with respect to the seabed floor. The second transporter 700 will also provide a signal for homing in on the location of the second disposal stage 103.

Figure 8:
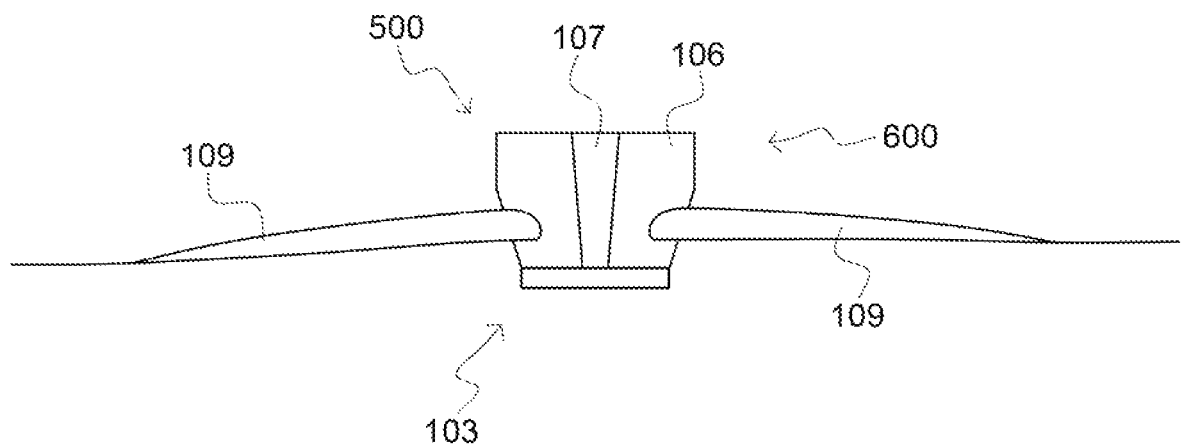
FIG. 8 is a side elevational view of a top portion of a second disposal stage of a nuclear waste disposal device deployed on seabed, according to one embodiment of the invention.

FIG. 8 is a side elevational view of a top portion of a second disposal stage of a nuclear waste disposal device deployed on seabed, according to one embodiment of the invention. As shown, the second disposal stage 103 includes an outer cylinder 106 with a plurality of second disposal fins 107 coupled to the outer cylinder 106. There is also an arrestor system 500 coupled to the outer cylinder 106, and shown in a deployed mode 600. The arrestor system 500 includes a plurality of petals 109 disposed between the plurality of second disposal fins 107.

Illustrated by this embodiment, there are a plurality of deployed petals 109, coupled to the second disposal stage 103 and extending outwardly therefrom, parallel to the seafloor. Accordingly, the petals 109 may extend onto the seafloor and/or its sub-seabed sediments. Also shown by FIG. 8, the second disposal stage includes second disposal fins 107, disposed between the petals 109.

Figure 9:
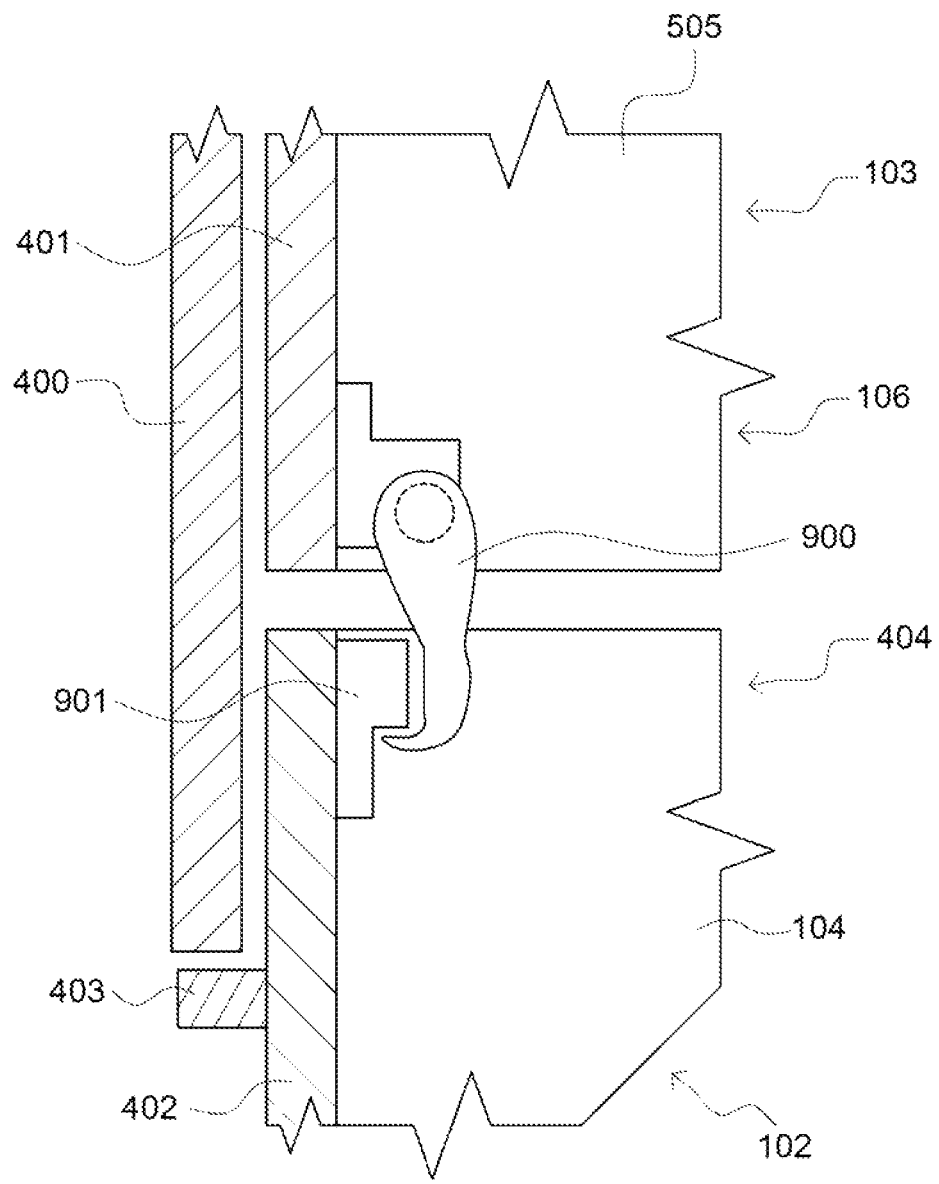
FIG. 9 is a side view of a spring-based latch covered by fins of a nuclear waste disposal device and coupling the first disposal stage and the second disposal stage together, according to one embodiment of the invention.

FIG. 9 illustrates a side view of a spring-based latch covered by fins of a nuclear waste disposal device and coupling a first disposal stage and a second disposal stage together, according to one embodiment of the invention. There is shown a first disposal stage 102 coupled to a second disposal stage 103, with an inner cylinder 400 disposed within an interior of outer cylinder 401 and an interior of outer shell 402. The first disposal stage 102 includes an outer shell 104 with a stop protrusion 403 coupled to a top portion of outer shell 404 and extending inwardly therefrom. The inner cylinder 400 is disposed along the stop protrusion 403. The outer shell 104 of the first disposal stage 102 is shown removably coupled to an outer cylinder 106 of the second disposal stage 103 by an impact-trigger spring-loaded latch 900. The illustrated spring-loaded latch 900 is coupled to a body of outer cylinder 505 and to a lip 901. The lip 901 is coupled to the outer shell 104 and extends therefrom, opposite the stop protrusion 403. There may be any number of latches 900 for coupling the first disposal stage 102 to the second disposal stage 103, such as but not limited to: one, two, four, or six.

The illustrated spring-loaded latch 900 is pivotally coupled to the second disposal stage 103 and is removably coupled to the lip 901. Upon impact, the first disposal stage 102 and the second disposal stage 103 may compress, allowing the spring loaded latch 900 to pivot off of the lip, and thereby uncoupling the first disposal stage 102 from the second disposal stage 103. Accordingly, the impact-trigger spring-loaded latch 900 and lip 901 may be part of the automatic disengagement device (See e.g., FIG. 2, Item 201). It is also understood that the automatic disengagement device (See e.g., FIG. 2, Item 201) may include a plurality of latches 900. The latches 900 may be spring-based to release but held in place by friction or a breakaway structure that keeps the latches 900 latched until separation is triggered, at which moment the spring-based latches 900 spring open and remain open, held by the springs thereof.

In operation of one embodiment of the invention, upon a triggering event (generally the tip of the first disposal stage 102 impacting the seabed), the latches 900 open to release and/or uncouple the first disposal stage 102 from the second disposal stage 103. A variety of latches may be used to removably couple the first disposal stage 102 to the second disposal stage 103. Some non-limiting examples of latches 900 that may be used include: draw latches, cam latches, Suffolk latches, elbow catches, or any mechanical fastener that joins the first disposal stage 102 to the second disposal stage 103 and allows for regular separation. Likewise, the latches 900 may be electronic and/or otherwise electronically/digitally engaged and/or disengaged.

Figure 10:
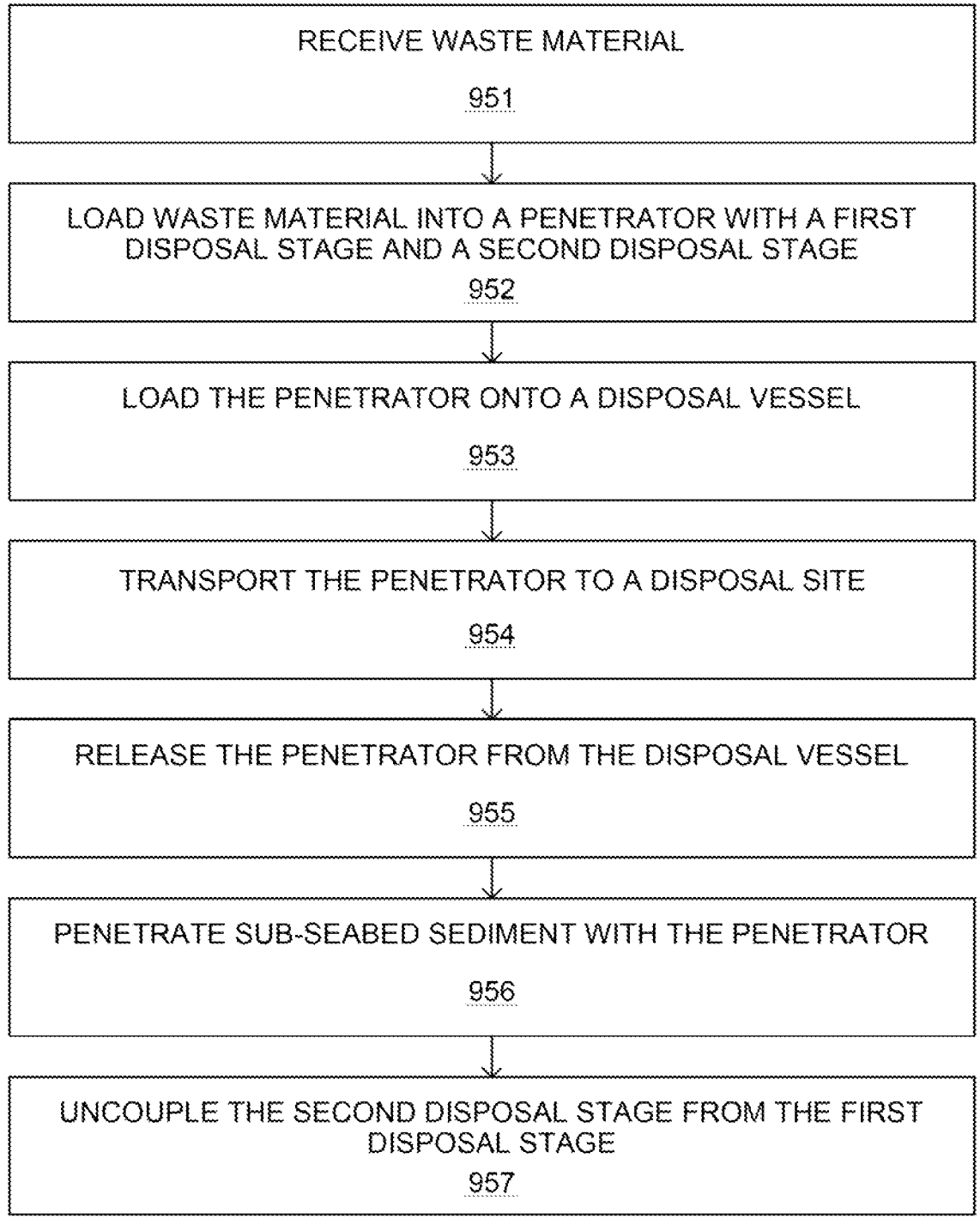
FIG. 10 is a flowchart of a method of disposing nuclear waste in a reversable fashion, according to one embodiment of the invention.

FIG. 10 is a flowchart of a method of disposing nuclear waste in a reversable fashion, according to one embodiment of the invention. As shown the method includes the steps of receiving waste material 951, loading the waste material into a first disposal stage of a penetrator 952, loading the penetrator onto a disposal vessel 953, transporting the penetrator to a disposal site 954, releasing the penetrator from the disposal vessel at the disposal site 955, penetrating the sub-seabed sediment of the ocean floor with the penetrator 956, and uncoupling the second disposal stage from the first disposal stage 957.

First, nuclear waste is collected from a site, such as a nuclear power plant. The material may be shipped in standardized containers to a port where they may be received 951 and loaded into penetrators 952. The penetrators may have a first disposal stage removably coupled to a second disposal stage (See e.g., FIG. 1, Items 102 and 103, respectively.) Wherein the penetrators may be shaped and sized to contain standardized HLW containers, the radioactive material does not need to be repackaged or removed from their containers.

The penetrators are then loaded onto a disposal vessel 953, such as but not limited to a ship, barge, tanker, carrier, cruiser, etc. The disposal vessels transport the penetrators to a selected disposal site 954. The designated disposal site may be selected in a plethora of ways. For instance, the designated disposal site may be selected by the following ways, such as, but not limited to a: 1. A site greater than 4,000 meters below the surface which may ensure the food chain link with the surface is broken; 2. A site in the abyssal plain or abyssal hills region which may ensure seismic stability; 3. A site located away from known ship wreck sites, known fisheries, known mineral resources, known undersea cables, and other such areas which may minimize the probability of future human intrusion; 4. A site with uniform site characteristics which may ensure consistent penetration depth and/or encapsulation and/or which may provide an effective barrier to prevent the migration of radionuclides; and/or 5. A site where the geological record of sediment deposition rate is greater than the migration rate of most of the radionuclides through the selected sediments which may ensure the radionuclides of concern remain within the sediments and/or do not escape into the ocean. Accordingly, the disposal site 954 may be selected based on a variety of criteria, such as but not limited to: seabed consistency, seismic activity, depth, distance, and so on.

Once at the disposal site, the penetrator is released from the disposal vessel 955 and the collected nuclear waste is deposited in the ocean floor. This may be accomplished by dropping free-fall penetrators, as those described herein, from an ocean-going vessel, such as through a moon pool of the same, at specific locations, one after the other, with specific/precise translational movement of the ocean-going vessel between each drop, in order to deposit the penetrators in an array on the ocean floor. When the penetrator reaches the ocean floor, it penetrates the sub-seabed sediment 956 and the second disposal stage is uncoupled from the first disposal stage 957.

Figure 11:
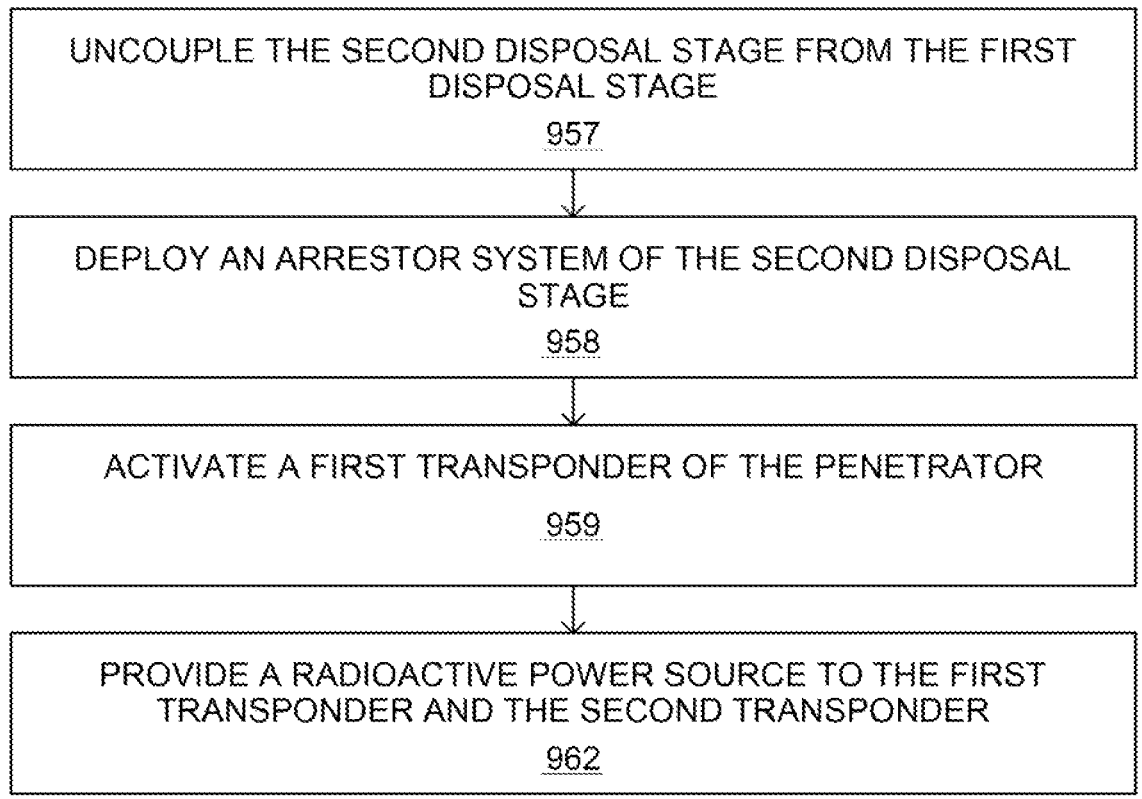
FIG. 11 is a flowchart of a method of retrievable disposal of nuclear waste, according to one embodiment of the invention.

FIG. 11 is a flowchart of a method of retrievable disposal of nuclear waste, according to one embodiment of the invention. There is shown a method including the steps of: uncoupling the second disposal stage from the first disposal stage 957, deploying an arrestor system coupled to a top portion of the second disposal stage 958, activating a transponder(s) coupled to the penetrator 959, and providing a radioactive power source to the transponder(s) 962.

The illustrated method includes a penetrator (See e.g., FIG. 1, Item 101). The penetrator (See e.g., FIG. 1, Item 101) has a first disposal stage (See e.g., FIG. 1, Item 102) with an outer shell (See e.g., FIG. 1, Item 104) disposed about a cavity (See e.g., FIG. 1, Item 105). The penetrator (See e.g., FIG. 1, Item 101) also includes a second disposal stage (See e.g., FIG. 1, Item 103) removably coupled to the first disposal stage (See e.g., FIG. 1, Item 102) by an automatic disengagement device (See e.g., FIG. 2, Item 201). The second disposal stage (See e.g., FIG. 1, Item 103) has an outer cylinder (See e.g., FIG. 1, Item 106), a plurality of second disposal fins (See e.g., FIG. 1, Item 107), and an arrestor system (See e.g., FIG. 1, Item 108).

As the second disposal stage is uncoupled from the first disposal stage 957 by an automatic disengagement device (See e.g., FIG. 2, Item 201), an arrestor system is activated 958. The arrestor system may include a plurality of petals (See e.g., FIG. 1, Item 109) that extend horizontally from the second disposal stage into the ocean floor in order to secure and stabilize the second disposal stage as the first disposal stage continues to travel down into sub-seabed sediments.

Once the nuclear waste is deposited in the ocean floor, a transponder of the penetrator is activated 959 so that it may be monitored. Transponders from the first disposal stage and the second disposal stage may be activated, respectively, and used to monitor the nuclear waste and provide data regarding specified properties of the nuclear waste. For example, the nuclear waste may be monitored for stability, location, etc. Activation 959 of the transponders may occur on, before, or during fee-fall or on or after deployment. A radioactive power source may be supplied to the transponders 962 for activation and signal transmission. The transponders may provide continuous signal transmission.

Figure 12:
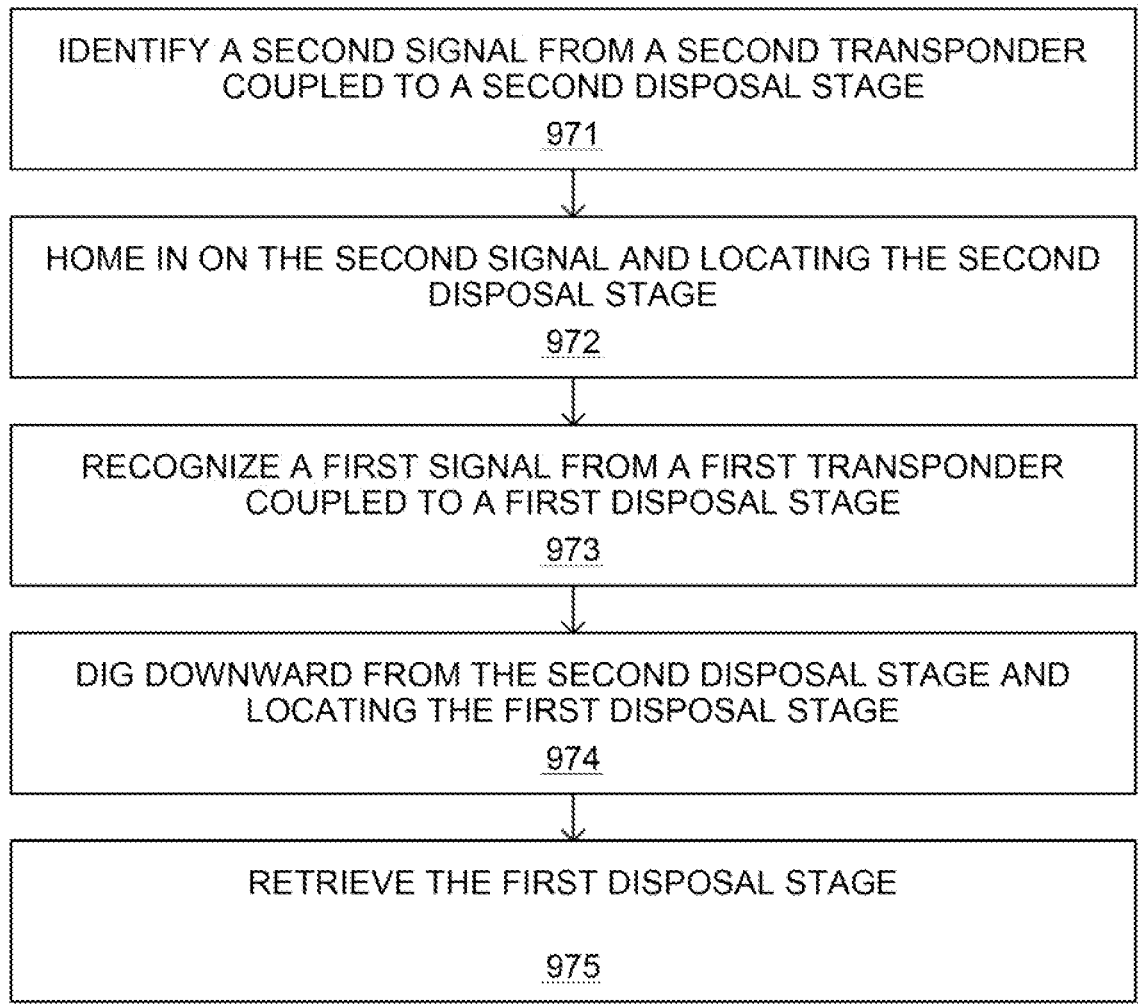
FIG. 12 is a flowchart of a method of retrieving nuclear waste, according to one embodiment of the invention.

FIG. 12 is a flowchart of a method of retrieving nuclear waste, according to one embodiment of the invention. A shown, the method includes the steps of identifying a second signal from a second transponder coupled to a second disposal stage located within a surface of a sub-seabed sediment of the ocean floor 971, homing in on the second signal and locating the second disposal stage 972, recognizing a first signal from a first transponder coupled to a first disposal stage located below the second disposal stage and within the sub-seabed sediment of the ocean floor 973, digging downward from the second disposal stage toward the first signal and locating the first disposal stage 974, retrieving the first disposal stage from the sub-seabed sediment of the ocean floor 975.

The illustrated retrieving the first disposal stage from the sub-seabed sediment of the ocean floor 975 includes retrieving a first disposal stage (See e.g. FIG. 1, Item 102) containing waste material. The deposited nuclear waste may be retrieved from the ocean floor 975 as desired. Using signal detection 971, an array of deployed second disposal stages may be found 972 at or near the locations where they were initially deposited. Once the second disposal stages are homed-in 972, signals from first disposal stages may be recognized 973. The second disposal stages may function as "re-entry" cones on the surface of sub-seabed sediments such that established deep ocean drilling techniques can be utilized to dig 974 and/or drill down to a first disposal stage from the second disposal stage so that the canister may be retrieved 975. The actual retrieval 975 may utilize techniques proven in the oil and gas industry for retrieving objects in deep wells. This may be done to remove the waste from the disposal location, for example, if a more suitable disposal solution is determined, or if the value of the spent nuclear fuel component of the waste reaches a high enough amount that warrants retrieval.

It is understood that the above-described embodiments are only illustrative of the application of the principles of the present invention. The present invention may be embodied in other specific forms without departing from its spirit or essential characteristics. The described embodiment is to be considered in all respects only as illustrative and not restrictive. The scope of the invention is, therefore, indicated by the appended claims rather than by the foregoing description. All changes which come within the meaning and range of equivalency of the claims are to be embraced within their scope.

For example, although the second transponder is shown disposed along the body of the second disposal stage, it understood that the second transponder may be disposed along any portion of the second disposal stage, such as along a fin or petal. In addition, the penetrator may have a variety of latch mechanisms, such as, but not limited to, an explosive bolt or shear pin. Also, the deployable petals may also have a variety of structures, such as sheets or an iris-structure. Similarly, the initial petal deployment trigger and mechanism may be all one mechanism, or it may be two or more mechanisms.

As another example, while nuclear waste is discussed herein, other types of waste may be disposed of using the system described herein.

Additionally, although the figures illustrate a first disposal stage and a second disposal stage each with four disposal fins, the stages may include any number of fins, such as, but not limited to: three, four, five, or ten. More, the fins on the stages may not align and may be staggered, etc. The first disposal stage fins may be angled, straight, and have any length configured to align with the fins of stage two. Additionally, the first disposal stage may have latch ledges configured to receive a latch from the second disposal stage. Similarly, the stages may be removably coupled via a friction fit, a cavity, explosive bolts, etc. More, the first disposal stage may have an inner ledge configured to drive up the inner cylinder upon impact. For example, the first disposal stage may include a flange of some sort to hit or strike the inner cylinder.

It is expected that there could be numerous variations of the design of this invention. For instance, it is envisioned that the first disposal stage may include a vent or venting system that equalizes pressure within the penetrator as it descends to the ocean floor. More, the first disposal stage may include an outer shell that is vented, unvented, cylindrical, long, skinny, fat, etc. Likewise, the cavity for canisters may have any shape configured to accommodate different shaped canisters, as well as different storage configurations for canisters or packed materials.

Furthermore, the second disposal stage may have a body of different shapes, such as, but not limited to, cylindrical, cuboidal, pentagonal, hexagonal, etc. In addition, the stage two fins may have any configuration to match or align with the stage one fins. For instance, the second disposal fins may have different shapes and/or be angled or straight.

Too, the release mechanism of the inner cylinder may be coupled to the perforated plate but may also be coupled elsewhere. Further, the perforated plate may be a fin or concentric cylinders. Even more, the cylinder may be a collection of mechanisms, components, or parts, rather than being configured as a complete cylinder. Furthermore, the canister may be configured to contain a variety of substances, solids, liquids, gases, etc.

Finally, it is envisioned that the components of the device may be constructed of a variety of materials, such as but not limited to: concrete, metal, glass, and/or plastic, and/or composites thereof, and such may be selected based on expected environmental conditions during loading, transport, release, penetration, and ultimate disposal within the seabed, so as to properly execute the desired functions, steps, operations, and results described herein.

Thus, while the present invention has been fully described above with particularity and detail in connection with what is presently deemed to be the most practical and preferred embodiment of the invention, it will be apparent to those of ordinary skill in the art that numerous modifications, including, but not limited to, variations in size, materials, shape, form, function and manner of operation, assembly and use may be made, without departing from the principles and concepts of the invention as set forth in the claims. Further, it is contemplated that an embodiment may be limited to consist of or to consist essentially of one or more of the features, functions, structures, methods described herein.

What is claimed is:

1. A method of depositing waste material into a sub-seabed sediment of the ocean floor, comprising:
   a. receiving waste material;
   b. loading the waste material into a first disposal stage of a penetrator, wherein the penetrator includes the first disposal stage and a second disposal stage removably coupled to the first disposal stage;
   c. loading the penetrator onto a disposal vessel;
   d. transporting the penetrator to a disposal site;
   e. releasing the penetrator from the disposal vessel at the disposal site;
   f. penetrating the sub-seabed sediment of the ocean floor with the penetrator; and
   g. uncoupling the second disposal stage from the first disposal stage.

2. The method of claim 1, further comprising the step of deploying an arrestor system coupled to a top portion of the second disposal stage.

3. The method of claim 2, wherein the penetrator includes:
   a. a first disposal stage, having an outer shell disposed about a cavity, the cavity being shaped and sized to receive a waste disposal canister; and
   b. a second disposal stage removably coupled to a top end of the first disposal stage by an automatic disengagement device including at least one of exploding bolts, spring loaded latches, or impact triggered magnetic couplings, the second disposal stage having: an outer cylinder, a plurality of second disposal fins disposed along a length of the outer cylinder, and an arrestor system coupled to a top portion of the outer cylinder.

4. The method of claim 3, further comprising the step of activating a transponder coupled to the penetrator.

5. The method of claim 4, further comprising the steps of activating a first transponder coupled to the first disposal stage, and activating a second transponder coupled to the second disposal stage and in communication with the first transponder.

6. The method of claim 5, further comprising the step of providing a radioactive power source to the first transponder and the second transponder.

* * * * *